(12) United States Patent
Liu et al.

(10) Patent No.: US 11,967,852 B2
(45) Date of Patent: Apr. 23, 2024

(54) CONTROL OF WIRELESS CHARGERS WITH POWER LINES

(71) Applicant: HEWLETT-PACKARD DEVELOPMENT COMPANY, L.P., Spring, TX (US)

(72) Inventors: Kuo-Hsien Liu, Taipei (TW); Jerome Arnaud Antoine Bove, Taipei (TW); Isaac Lagnado, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

(21) Appl. No.: 17/870,812

(22) Filed: Jul. 21, 2022

(65) Prior Publication Data
US 2024/0030736 A1  Jan. 25, 2024

(51) Int. Cl.
*H02J 7/00* (2006.01)
*H02J 50/00* (2016.01)

(52) U.S. Cl.
CPC ........ *H02J 7/00712* (2020.01); *H02J 7/0047* (2013.01); *H02J 50/00* (2016.02)

(58) Field of Classification Search
CPC .. H02J 50/12; H02J 50/80; H02J 50/10; H02J 50/90; H02J 7/0042; H02J 50/40; H02J 50/50; H02J 50/20; H02J 7/00034; H02J 7/0044; H02J 7/0068; H02J 2207/40; H02J 7/342; H02J 50/60; H02J 7/0047; H02J 7/00714; H02J 7/007192; H02J 7/02; H02J 2310/48; H02J 50/30; H02J 7/00045; H02J 7/0013; H02J 7/0048; H04B 5/79; H04B 5/72; H04B 5/24; H04B 5/26

See application file for complete search history.

(56) References Cited

U.S. PATENT DOCUMENTS

2020/0343777 A1* 10/2020 Jia ................... H02J 7/00714

* cited by examiner

*Primary Examiner* — Lincoln D Donovan
*Assistant Examiner* — Tyler J Pereny
(74) *Attorney, Agent, or Firm* — Quarles & Brady LLP

(57) ABSTRACT

An example device includes a power regulator to provide electrical power to a wireless charger over a power line and a controller connected to the power regulator. The controller is to generate a signal that encodes an allowable power draw of the wireless charger and communicate the signal to the power regulator. The power regulator communicates the signal with the electrical power transmitted over the power line to the wireless charger.

20 Claims, 7 Drawing Sheets

CONTROL OF WIRELESS CHARGERS WITH POWER LINES

BACKGROUND

Wireless charging allows portable devices to have their batteries charged without connecting a cable to transmit power. A typical wireless charger includes a coil that outputs electromagnetic radiation that is captured by a coil of the device to be charged.

BRIEF DESCRIPTION OF THE DRAWINGS

FIGS. 7A, 7B, and 7C are diagrams of example signals to encode an allowable power draw of a wireless charger, in which FIG. 7A shows a signal that indicates a slow charge, FIG. 7B shows a signal that indicates stopping charging, and FIG. 7C shows a signal that indicates a fast charge.

DETAILED DESCRIPTION

Integrating a wireless charger into a computing device may increase the complexity of the computing device and may make the power management operations of the computing device less efficient.

This disclosure describes devices and other techniques to provide wireless charging functionality to a computing device, such as an All-in-One (AiO) computer, desktop computer, or notebook computer, so that the computing device may be used to wirelessly charge a portable electronic device, such as a smartphone.

Simplified construction and operation are achieved by providing a signal to a power line that connects a power regulator with a wireless charger. The signal may be encoded with an allowable power draw for the wireless charger, which decodes the signal an enforces the allowable power draw. Using the power line to communicate the signal removes the need for a separate data connection between the controller and the wireless charger. The signal may include pulse patterns, such as negative pulses, to indicate an allowable power draw for the wireless charger. A controller may generate a signal representative of an allowable power draw based on power usage of other components of the computing device.

Figure 1:
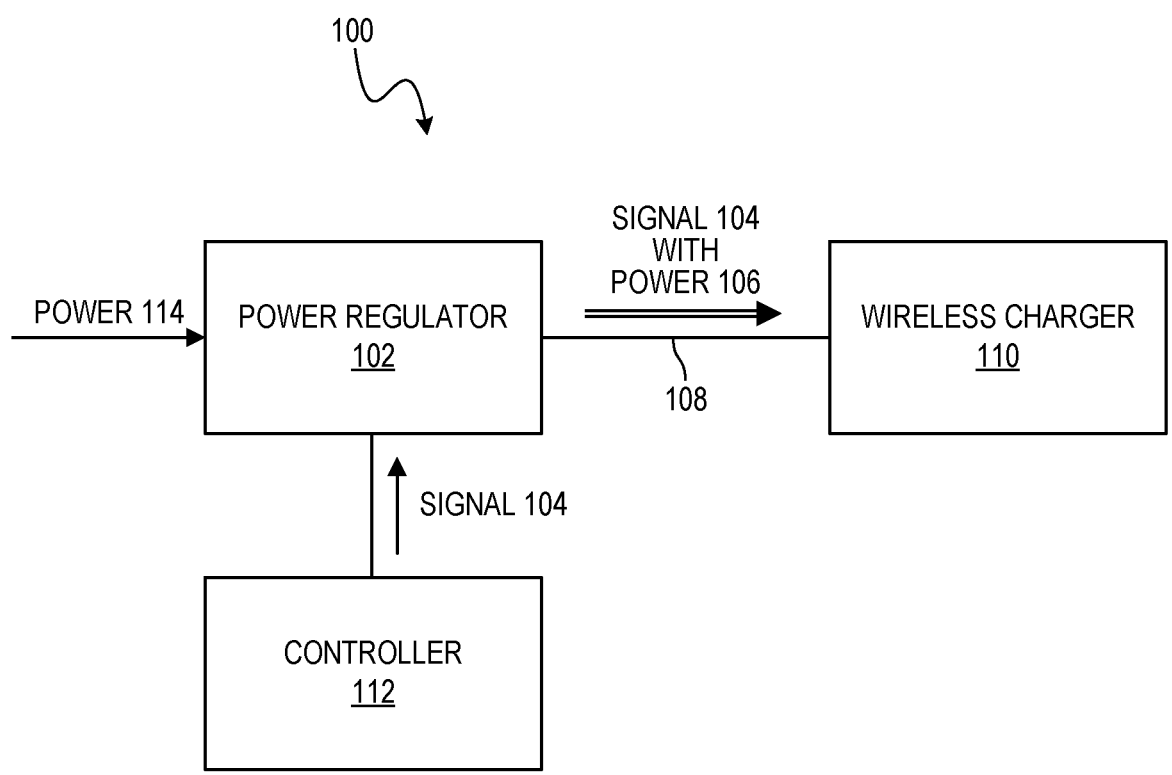
FIG. 1 is a block diagram of an example device including a power regulator that communicates a signal with electrical power over a power line to a wireless charger, in which the signal encodes an allowable power draw of the wireless charger.

FIG. 1 is a block diagram of an example device 100 including a power regulator 102 that communicates a signal 104 with electrical power 106 over a power line 108 to a wireless charger 110. The signal 104 encodes an allowable power draw of the wireless charger 110. The device 100 may be provided to a computing device that integrates the wireless charger 110 to charge a portable electronic device, such as a smartphone. Example computing devices include an AiO computer, a notebook computer, and a desktop computer. A computing device may have a wireless charger 110 integrated into a horizontal surface, on which a device to be charge may be rested. In other examples, the device 100 may be provided to a wireless charging device that is separate from a computing device.

The device 100 includes a power regulator 102. The power regulator 102 receives electrical power 114 from a power supply. The power regulator 102 provides regulated electrical power 106 to a wireless charger 110 over a power line 108. In various examples, the provided electrical power is direct-current (DC) power (e.g., 19.5 Volts) and the power regulator 102 includes a step-down DC-to-DC converter (buck converter) that outputs DC electrical power 106 at a lower level, such as 15 Volts (V). The wireless charger 110 in various example may have a nominal power rating of 15 Watts (W).

The device further includes a controller 112 connected to the power regulator 102. The controller 112 may include a microprocessor or other processor and may be termed an embedded controller (EC). The controller 112 includes or cooperates with a non-transitory machine-readable medium, which may include an electronic, magnetic, optical, or other physical memory or storage device that encodes instructions that implement the functionality discussed herein. The instructions may include directly executed instructions, such as a binary sequence or machine code. The instructions may include interpretable code, bytecode, source code, or similar instructions that may undergo additional processing to be executed. All of such examples may be considered executable instructions.

The controller 112 generates a signal 104 that encodes an allowable power draw of the wireless charger 110. The controller 112 may include or be considered an encoder that encodes and allowable power draw into the signal 104. The controller 112 may select the signal 104 from a range of predetermined signals or patterns that encode a range of corresponding allowable power draws. Such as range may define different charging rates, such as fast charging, slow charging, and no charging. The controller 112 may generate the signal as a sequence of voltage pulses, such as sequence of negative voltage pulses. A number of voltage pulses may encode the allowable power draw. For example, three pulses during a certain period may indicate a lower allowable power draw than one pulse over the same period.

The controller 112 further communicates the signal 104 to the power regulator 102.

The power regulator 102 communicates the signal 104 with the electrical power 106 transmitted over the power line 108 to the wireless charger 110. In various examples, the electrical power 106 is a nominally constant voltage (e.g., 15 Volts) and the power regulator 102 applies the signal 104, in the same form as received from the controller 112, as a dynamic component of the electrical power 106. The signal 104 may be capacitively coupled onto the electrical power 106 outputted by the power regulator 102.

The wireless charger 110 receives the power 106 and signal 104, decodes the allowable power draw from the signal 104, and enforces the allowable power draw, which may include overriding a degree of charging requested by a portable electronic device undergoing charging by the wireless charger 110.

Figure 2:
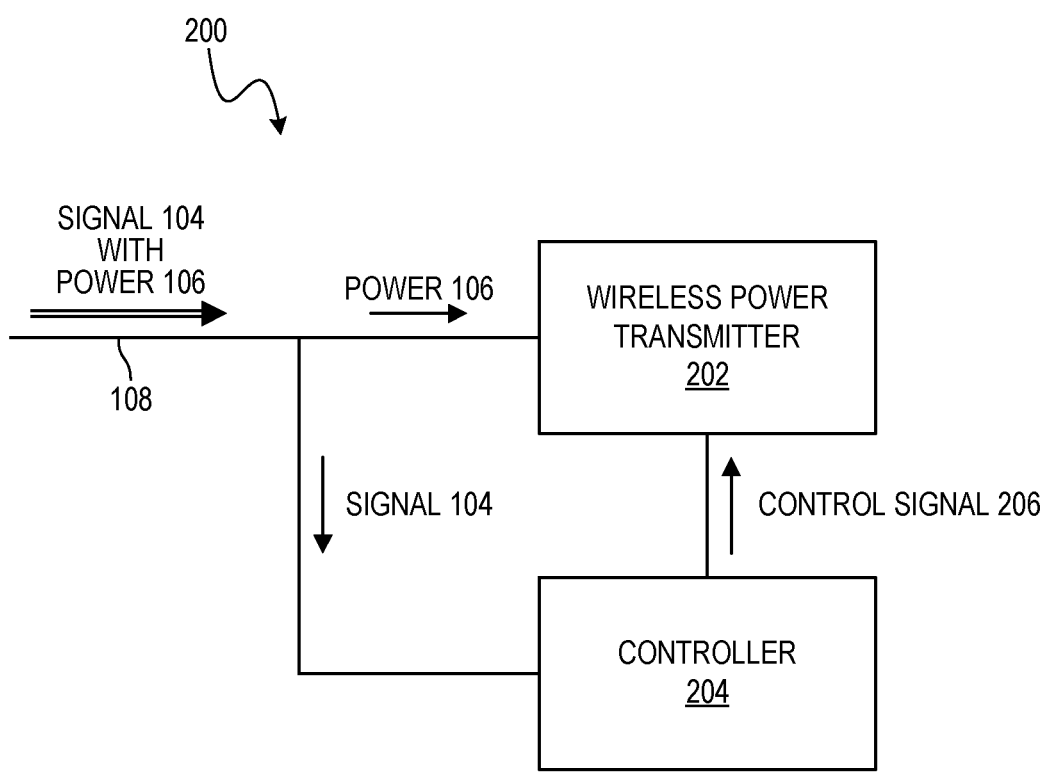
FIG. 2 is a block diagram of an example device including a wireless power transmitter that receives electrical power over a power line and a controller that controls the wireless power transmitter based on a signal received over the power line.

FIG. 2 is a block diagram of an example device 200 that includes a wireless power transmitter 202 that receives electrical power 106 over a power line 108 and a controller 204 that controls the wireless power transmitter 202 based on a signal 104 received over the power line 108.

The device 200 may provide wireless charging functionality to a portable electronic device, such as a smartphone. The device 200 may be provided to a computing device such as an AiO computer, a notebook computer, and a desktop computer. In other examples, the device 200 may be provided separate from a computing device.

The device 200 may be used as the wireless charger 110 of FIG. 1.

The device 200 includes a wireless power transmitter 202 to receive electrical power 106 from a power regulator (e.g., regulator 102 of FIG. 1) over a power line 108. Power 106 and signal 104 may be transmitted over the power line 108 simultaneously. The wireless power transmitter 202 charges a suitable portable electronic device in the effective range of the wireless power transmitter 202. The wireless power transmitter 202 may be responsive to a charging power demanded by the portable electronic device.

The device 200 further includes a controller 204 connected to the wireless power transmitter 202 and to the power line 108. The controller 204 may include a microprocessor or other processor. The controller 204 may be integrated within the wireless power transmitter 202 or may be a separate device. The controller 204 includes or cooperates with a non-transitory machine-readable medium, which may include an electronic, magnetic, optical, or other physical memory or storage device that encodes instructions that implement the functionality discussed herein. The instructions may include directly executed instructions, such as a binary sequence or machine code. The instructions may include interpretable code, bytecode, source code, or similar instructions that may undergo additional processing to be executed. All of such examples may be considered executable instructions.

The controller 204 senses the signal 104 on the power line 108 while electrical power 106 is received by the wireless charger over the power line 108. A Zener diode may be provided to the controller 204 to extract the signal 104 from the power 106.

The controller 204 decodes the signal to obtain an allowable power draw of wireless power transmitter 202. The controller 204 may include or be considered a decoder that decodes the signal 104. The signal 104 may include a sequence of voltage pulses, such as sequence of negative voltage pulses, in which a number of voltage pulses per unit time encodes the allowable power draw. The controller 204 may match the signal 104 to a range of predetermined signals or patterns that encode a range of corresponding allowable power draws. Such a range may define different charging rates, such as fast charging, slow charging, and no charging.

Further, the controller 204 limits the power draw of the wireless power transmitter 202 to the allowable power draw indicated by decoding of the signal 104. The controller 204 may transmit a control signal 206 to the wireless power transmitter 202 to set a current or power limit of the wireless power transmitter 202.

The controller 204 may limit the power draw of the wireless power transmitter 202 to a lesser of the allowable power draw indicated by the signal 104 and a power demanded by a portable electronic device being charge by the wireless power transmitter 202.

Figure 3:
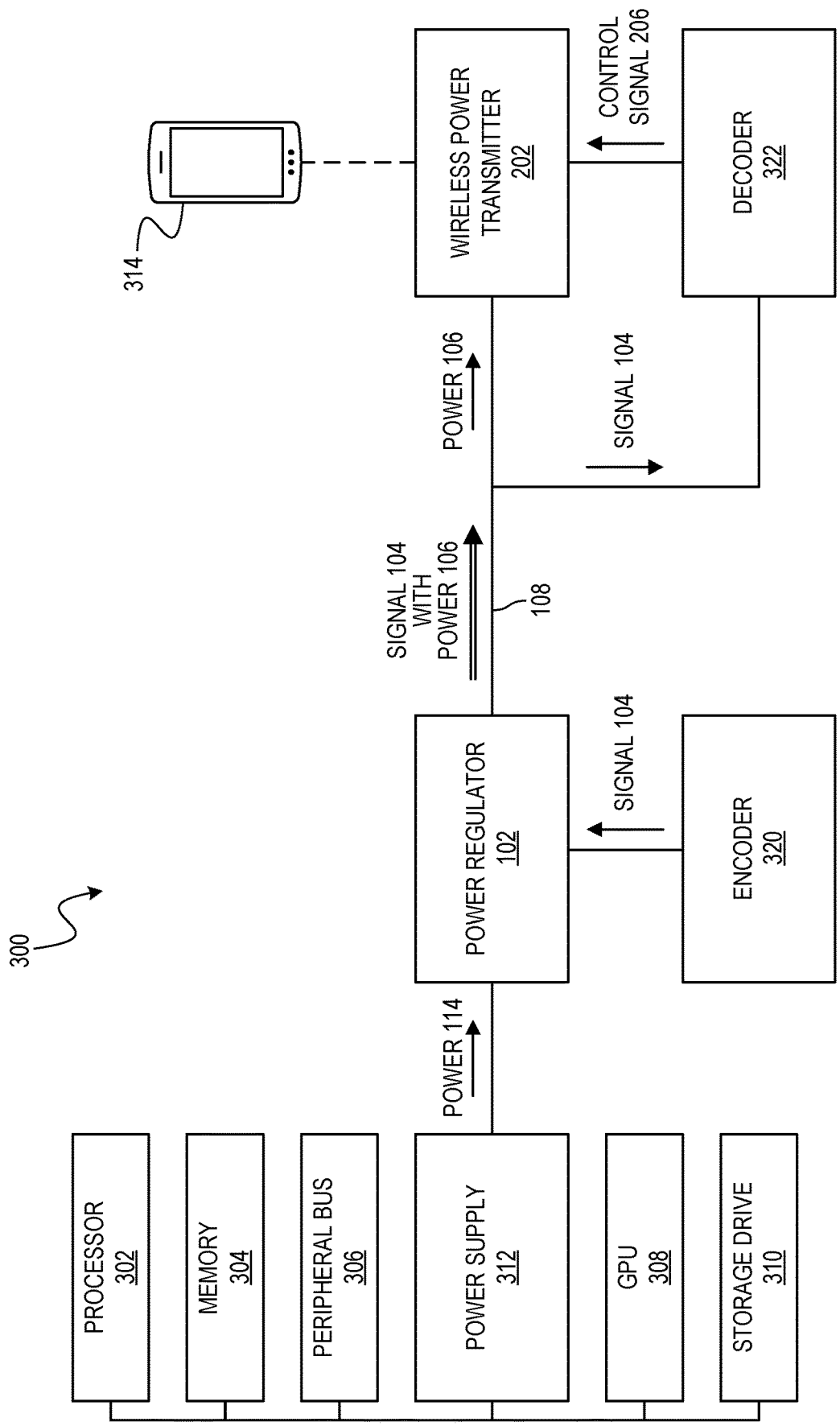
FIG. 3 is a block diagram of an example computing device to limit a power draw of a wireless power transmitter to an allowable power draw indicated by a signal communicated over a power line.

FIG. 3 shows an example computing device 300 to limit a power draw of a wireless power transmitter 202 to an allowable power draw indicated by a signal 104 communicated over a power line 108. The computing device 300 may be an AiO computer or similar computing device.

The computing device 300 may include a processor 302 (e.g., a central processing unit or CPU), memory 304, peripheral bus 306, graphics processing unit (GPU) 308, storage drive 310, and/or other power consuming electrical components.

The computing device 300 further includes a power supply 312 connected to the components 302-310 to supply the components 302-310 with electrical power.

The computing device 300 further includes a power regulator 102 and a wireless power transmitter 202 connected to the power regulator 102 by a power line 108.

The power regulator 102 is connected to the power supply 312. The power regulator 102 receives power from the power supply 312 and provides power 106 to the wireless power transmitter 202 via the power line 108;

The wireless power transmitter 202 uses the power 106 to charge a portable electronic device 314 brought into the effective range of the wireless power transmitter 202.

The computing device 300 further includes an encoder 320 connected to the power regulator 102 and a decoder 322 connected to the wireless power transmitter 202. The encoder 320 and decoder 322 may be implemented with respective controllers.

The encoder 320 encodes a signal 104 indicative of an allowable power draw of the wireless power transmitter 202. The encoder 320 encodes the signal 104 into the electrical power 106 provided by the power regulator 102 to the wireless power transmitter 202 over the power line 108.

The encoder 320 may encode the signal 104 with a pattern selected from a range of predetermined patterns that encode a range of corresponding allowable power draws, which may correspond to different rates of charging of the portable electronic device 314. The encoder 320 may encode the signal 104 as a sequence of voltage pulses, such as a sequence that contains only negative voltage pulses.

The decoder 322 decodes the signal 104 on the power line 108 and limits a power draw of the wireless power transmitter 202 to the allowable power draw indicated by the signal 104. The decoder 322 may output a control signal 206 to the wireless power transmitter 202 to set the allowable power draw.

The decoder 322 may match the signal 104 to the same range of predetermined patterns referenced by the encoder 320 when generating the signal 104. The wireless power transmitter 202 may take the allowable power draw indicated by the decoder 322 to override a power demanded by the portable electronic device 314. That is, the control signal 206 provided by the decoder 322 may govern.

The encoder 320 may monitor a total power draw at the power supply 312. The encoder 320 may determine the allowable power draw based on the total power draw at the power supply 312, so that operation of the wireless power transmitter 202 is managed in view of power demand, spikes, and surges.

Figure 4:
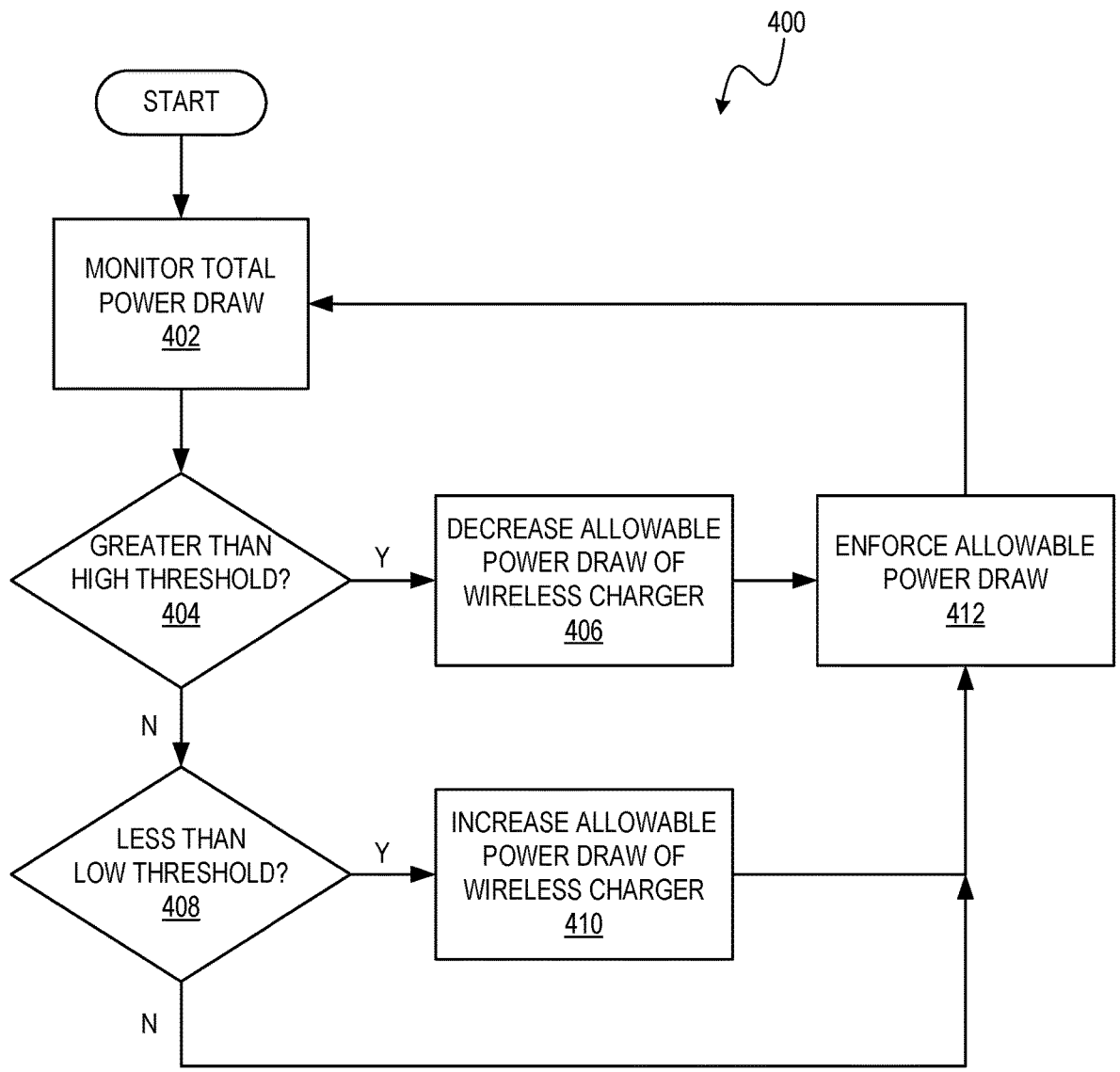
FIG. 4 is a flowchart of an example method of limiting a power draw of a wireless power transmitter to an allowable power draw.

FIG. 4 shows an example method 400 of limiting a power draw of a wireless power transmitter to an allowable power draw. The method 400 may be implemented by instructions executable by a controller or encoder, as discussed elsewhere herein. For example, the method 400 may be implemented by the encoder 320 and decoder 322 and with the computing device 300 of FIG. 3.

At block 402, a total power draw at a power supply is monitored.

At block 404, the total power draw is compared to a high threshold to determine whether an allowable power draw for a wireless charger should be decreased to avoid overloading the power supply. With a 65-Watt power supply, an example of a high threshold is 60 Watts. With a 90-Watt power supply, an example of a high threshold is 80 Watts.

At block 406, if the high threshold is exceeded, the allowable power draw for a wireless charger is decreased to a level that provides a slow charge to a portable electronic device in the effective range of the wireless charger. A signal for delivery over a power line may be encoded respectively.

At block 408, the total power draw is compared to a low threshold to determine whether an allowable power draw for a wireless charger can be increased to provide faster charging. With a 65-Watt power supply, an example of a low threshold is 45 Watts. With a 90-Watt power supply, an example of a low threshold is 75 Watts.

At block 410, if the total power draw is less than the low threshold, the allowable power draw for the wireless charger is increased to a level that provides a fast charge to a portable electronic device in the effective range of the wireless charger. A signal for delivery over a power line may be encoded respectively.

At block 412, the selected allowable power draw for the wireless charger is enforced at the wireless charger. This may include communicating the signal over a power line to the wireless charger and decoding the allowable power draw encoded into the signal. This may further include setting a current limit at the wireless charger and may further include overriding a power draw requested by a portable electronic device in the effective range of the wireless charger.

The method 400 may repeat continuously to increase, decrease, or maintain the allowable power draw of the wireless charger to be consistent with total power draw to avoid overloading the power supply.

Figure 5:
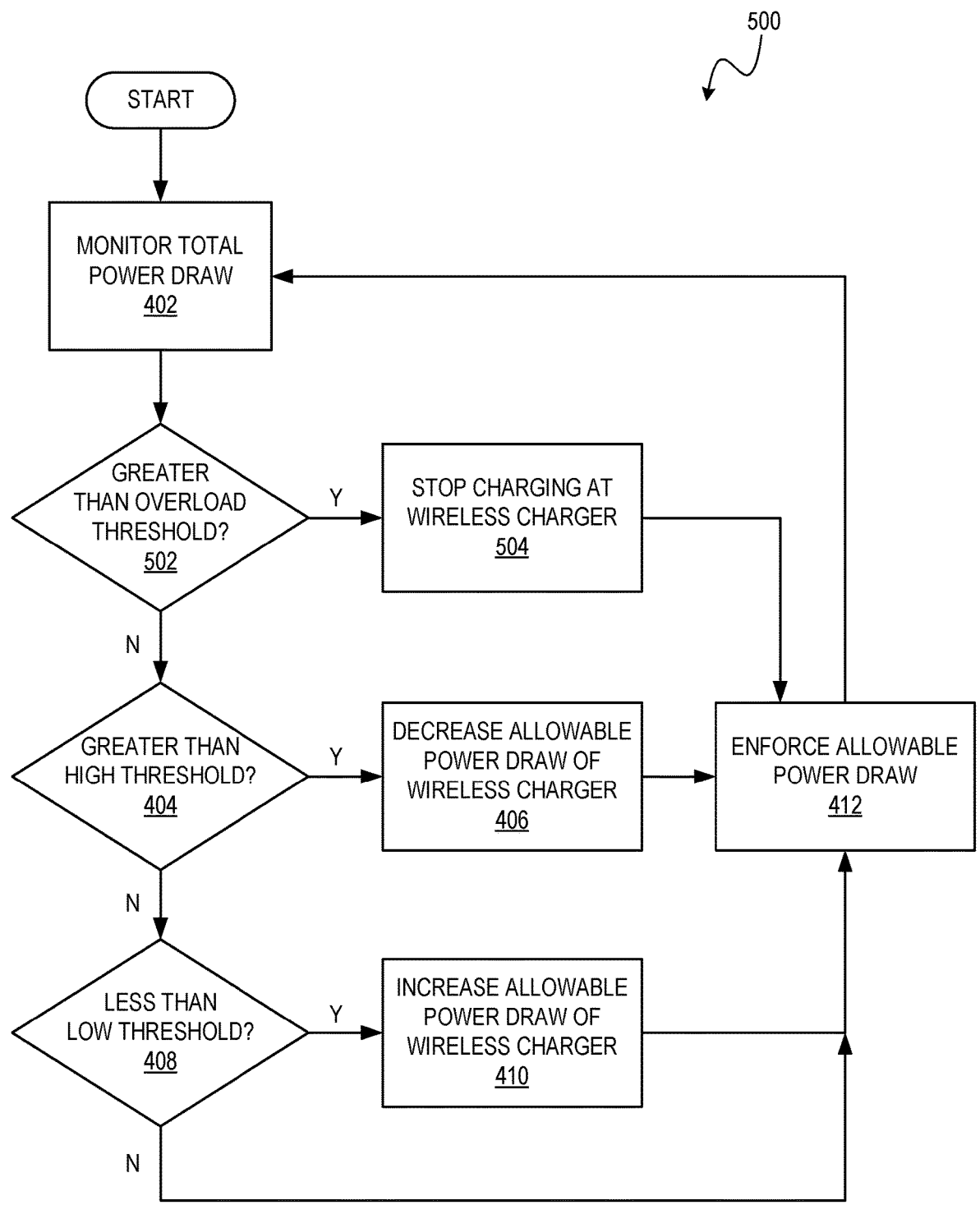
FIG. 5 is a flowchart of another example method of limiting a power draw of a wireless power transmitter to an allowable power draw.

FIG. 5 shows an example method 500 of limiting a power draw of a wireless power transmitter to an allowable power draw. The method 500 may be implemented by instructions executable by a controller or encoder, as discussed elsewhere herein. For example, the method 500 may be implemented by the encoder 320 and decoder 322 and with the computing device 300 of FIG. 3.

The method 500 is similar to the method 400 and only differences will be described in detail.

At block 502, the total power draw is compared to an overload threshold to determine whether operation of the wireless charger should be temporarily halted to avoid overloading the power supply to a degree that would trigger a safety shut down. With a 65-Watt power supply, an example of an overload threshold is 63 Watts. With a 90-Watt power supply, an example of an overload threshold is 88 Watts.

At block 504, if the overload threshold is exceeded, the allowable power draw for a wireless charger may be set to a level (e.g., 0 Watts) that provides no charge to a portable electronic device in the effective range of the wireless charger. A signal for delivery over a power line may be encoded respectively.

The no charge power level is enforced at block 412 until the monitored total power draw no longer exceeds the overload threshold.

The method 500 may repeat continuously to increase, decrease, or maintain the allowable power draw of the wireless charger to be consistent with total power draw to avoid overloading the power supply.

Figure 6:
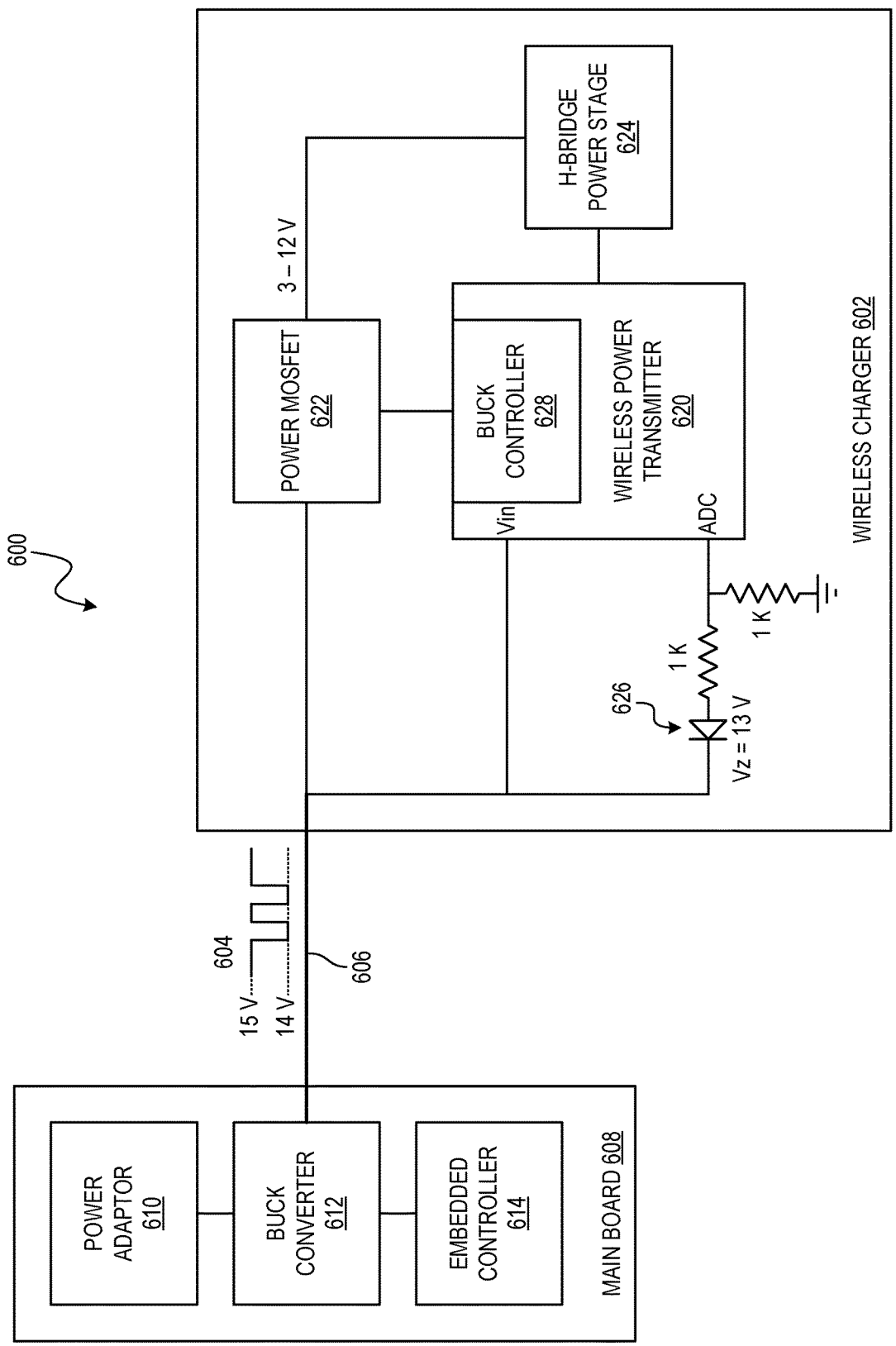
FIG. 6 is a block diagram of another example computing device to limit a power draw of a wireless charger to an allowable power draw indicated by a signal communicated over a power line.

FIG. 6 shows another example computing device 600 to limit a power draw of a wireless charger 602 to an allowable power draw indicated by a signal 604 communicated over a power line 606. The computing device 600 may be an AiO computer or similar computing device.

The computing device 600 includes a main board 608 that may carry a power adaptor 610, buck converter 612, embedded controller 614, as well as other components.

The power adaptor 610 may provide power to the main board 608 from a power supply. The power adaptor 610 may provide DC a level of, for example, 19.5 Volts.

The buck converter 612 may take power from the power adaptor 610 and convert it to a DC level of 15 Volts.

The embedded controller 614 may encode a signal 604 to the DC level outputted by the buck converter 612 as, for example, a sequence of −1 Volt pulses. The signal 604 may be used to indicate an allowable power draw for wireless charger 602 via a power line 606 at which power is provided to the wireless charger 602. The signal 604 may be capacitively coupled onto the DC level.

The wireless charger 602 may include a wireless power transmitter integrated circuit (IC) 620, a power metal-oxide-semiconductor field-effect transistor (MOSFET) 622, and an H-bridge power stage 624.

The power MOSFET 622 may take power from the line 606, nominally at 15 Volts, and provide a charging power to the H-bridge power stage 624 of 3-12 Volts, as controlled by the wireless power transmitter 620.

The wireless power transmitter 620 takes operational power from the power line 606, nominally at 15 Volts. The wireless power transmitter 620 further obtains the signal 604 from the power line 606 via a Zener diode 626 at an analog-to-digital (ADC) input. The Zener diode 626 may have a Zener voltage of 13 Volts to correspond to the normal 15-Volt level on the power line with −1 Volt signal pulses. The ADC input may be grounded via a 1 kilo-ohm resistor and may be connected to an anode of the Zener diode 626 via another 1 kilo-ohm resistor.

The wireless power transmitter 620 may include a buck controller 628 that decodes the signal 604 obtained via the ADC input of the wireless power transmitter 620. The buck controller 628 may control the power MOSFET 622 according to the decoded signal to enforce the allowable power draw set by the embedded controller 614.

Figure 7A:
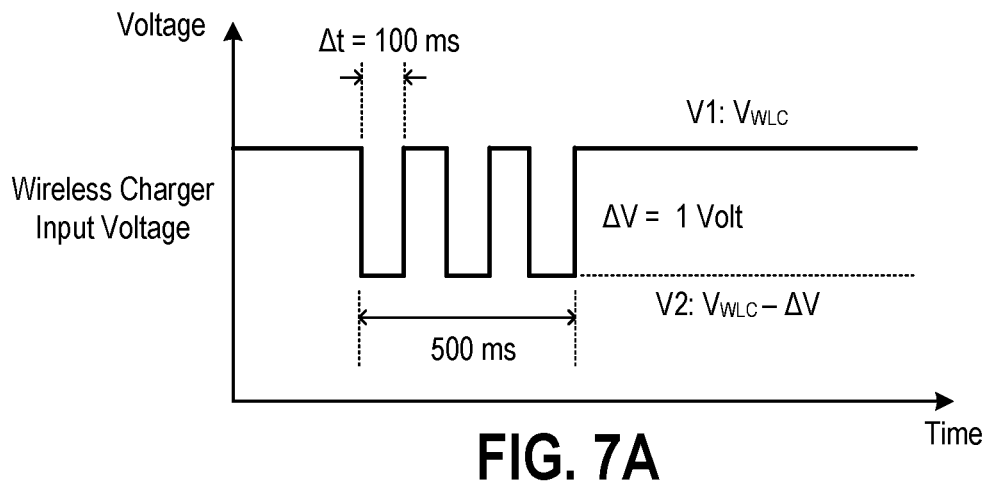
Figure 7B:
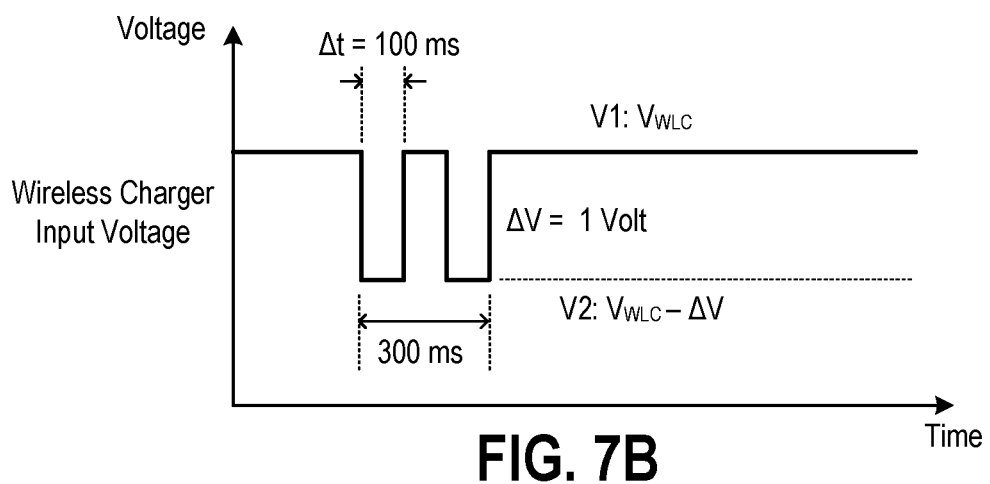
Figure 7C:
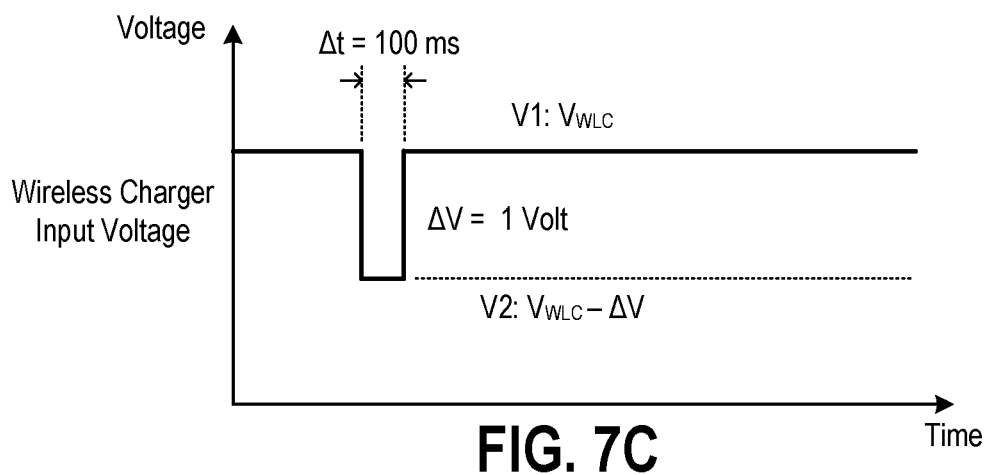

FIGS. 7A, 7B, and 7C show example signals to encode an allowable power draw of a wireless charger. FIG. 7A shows a signal that indicates a slow charge. FIG. 7B shows a signal that indicates stopping charging. FIG. 7C shows a signal that indicates a fast charge. In these examples, negative voltage pulses with respect to a wireless charger ("WLC") input voltage (e.g., power 106) are 1 Volt in magnitude, 100 milliseconds (ms) in duration, and separated by 100 ms. The signals may be used as any of the signals discussed above.

In view of the above, it should be apparent that simplified construction and operation for control of wireless charging may be achieved by a controller, encoder, and/or decoder that operate on a signal at a power line that connects a power regulator with a wireless charger. Such techniques are particular useful in a computing device, such as an AiO computer, that includes other power-using components.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
   a power regulator to provide electrical power to a wireless charger over a power line;
   a controller connected to the power regulator, the controller to:
      generate a signal that encodes an allowable power draw of the wireless charger; and
      communicate the signal to the power regulator, wherein the power regulator communicates the signal with the electrical power transmitted over the power line to the wireless charger.

2. The device of claim 1, wherein the controller is further connected to a power supply that supplies power to the power regulator and to another electrical component, and wherein the controller is further to:
   monitor a total power draw at the power supply;
   generate the signal to encode the allowable power draw of the wireless charger based on the total power draw.

3. The device of claim 2, wherein the controller is further to:
   generate the signal to encode a decreased allowable power draw when the total power draw increases; and
   generate the signal to encode an increased allowable power draw when the total power draw decreases.

4. The device of claim 1, wherein the controller is to select the signal from a range of predetermined signals that encode a range of corresponding allowable power draws.

5. The device of claim 1, wherein the controller is to generate the signal as a sequence of voltage pulses.

6. The device of claim 5, wherein a number of voltage pulses encodes the allowable power draw.

7. The device of claim 5, wherein the sequence of voltage pulses includes negative voltage pulses.

8. A device comprising:
   a wireless power transmitter to receive electrical power from a power regulator over a power line;
   a controller connected to the wireless power transmitter, the controller to:
      sense a signal on the power line while electrical power is received over the power line by the wireless power transmitter;
      decode the signal to obtain an allowable power draw of the wireless power transmitter; and
      limit a power draw of the wireless power transmitter to the allowable power draw.

9. The device of claim 8, wherein the controller is to match the signal to a range of predetermined signals that encode a range of corresponding allowable power draws.

10. The device of claim 9, wherein the range of corresponding allowable power draws correspond to a fast charge, slow charge, and no charge of a portable electronic device within an effective charging range of the wireless power transmitter.

11. The device of claim 8, wherein the controller is to limit the power draw of the wireless power transmitter to a lesser of the allowable power draw and a power demanded by a portable electronic device within an effective charging range of the wireless power transmitter.

12. A device comprising:
   a wireless power transmitter to charge a portable electronic device;
   a power regulator to provide electrical power to the wireless power transmitter over a power line;
   an encoder connected to the power regulator to encode a signal indicative of an allowable power draw into the electrical power provided by the power regulator to the wireless power transmitter over the power line; and
   a decoder connected to the wireless power transmitter to decode the signal on the power line and limit a power draw of the wireless power transmitter to the allowable power draw indicated by the signal.

13. The device of claim 12, further comprising:
   a power supply connected to the power regulator;
   an electrical component connected to the power supply;
   wherein the encoder is further to determine the allowable power draw based on a total power draw at the power supply.

14. The device of claim 12, wherein the encoder is further to:
   encode a decreased allowable power draw when the total power draw increases above a high threshold; and
   encode an increased allowable power draw when the total power draw decreases below a low threshold that is lower than the high threshold.

15. The device of claim 12, wherein the encoder is to encode the signal with a pattern selected from a range of predetermined patterns that encode a range of corresponding allowable power draws.

16. The device of claim 12, wherein the encoder is to encode the allowable power draw as a sequence of voltage pulses.

17. The device of claim 16, wherein the sequence of voltage pulses includes only negative voltage pulses.

18. The device of claim 12, wherein the decoder is to match the signal to a range of predetermined patterns that correlate to a range of corresponding allowable power draws.

19. The device of claim 18, wherein the range of corresponding allowable power draws correspond different rates of charging of the portable electronic device.

20. The device of claim 12, wherein the allowable power draw overrides a power demanded by the portable electronic device.

* * * * *